United States Patent
Tichborne et al.

(10) Patent No.: US 8,634,716 B2
(45) Date of Patent: Jan. 21, 2014

(54) DATA TRANSMISSION NETWORK

(75) Inventors: Franklin Tichborne, Bristol (GB); Joseph K-W Lam, Bristol (GB); Simon Masters, Bristol (GB); David Parmenter, Bristol (GB)

(73) Assignee: Airbus Operations Limited, Bristol (GB)

( * ) Notice: Subject to any disclaimer, the term of this patent is extended or adjusted under 35 U.S.C. 154(b) by 11 days.

(21) Appl. No.: 13/290,434

(22) Filed: Nov. 7, 2011

(65) Prior Publication Data

US 2012/0134679 A1 May 31, 2012

(30) Foreign Application Priority Data

Nov. 30, 2010 (GB) .................................. 1020201.8

(51) Int. Cl.
*H04J 14/00* (2006.01)

(52) U.S. Cl.
USPC .................. 398/72; 398/66; 398/67; 398/68; 398/58; 398/60; 398/168; 398/128; 398/130; 398/138; 398/139; 398/118; 385/24; 385/89; 385/90; 385/92; 385/93

(58) Field of Classification Search
USPC ............. 398/110, 114, 66, 67, 68, 70, 71, 72, 398/73, 58, 59, 60, 79, 141, 135, 138, 139, 398/118, 126, 128, 130, 42, 168; 385/12, 385/24, 89, 90, 92, 93
See application file for complete search history.

(56) References Cited

U.S. PATENT DOCUMENTS

| | | | | |
|---|---|---|---|---|
| 4,422,180 A | * | 12/1983 | Wendt | ........................... 398/110 |
| 4,950,043 A | * | 8/1990 | Russom | ........................... 385/12 |
| 8,374,506 B2 | * | 2/2013 | Stark | ............................. 398/114 |
| 2004/0208599 A1 | | 10/2004 | Swartz et al. | |
| 2005/0279358 A1 | * | 12/2005 | Richey | ..................... 128/204.23 |

FOREIGN PATENT DOCUMENTS

| | | |
|---|---|---|
| EP | 2056492 A1 | 5/2009 |
| GB | 2137040 A | 9/1984 |
| GB | 2168214 A | 6/1986 |
| WO | 00-04653 A2 | 1/2000 |
| WO | 02-05459 A2 | 1/2002 |
| WO | 03-073705 A1 | 9/2003 |

OTHER PUBLICATIONS

Damon W.K. Wong, George Chen, "Optical design and multipath analysis for broadband optical wireless in an aircraft passenger cabin application," IEEE Transaction on Vehicular Technology, vol. 57 (6), pp. 3598-3606, Nov. 2008.
British Search Report for 1020201.8 dated Mar. 30, 2011.

* cited by examiner

*Primary Examiner* — Hanh Phan
(74) *Attorney, Agent, or Firm* — Lowe Hauptman & Ham, LLP

(57) ABSTRACT

A data transmission network comprising: a base comprising: a base light source and a base light detector; a plurality of nodes, each node comprising a node light source and a node light detector; and a plurality of optical fibers arranged to form a optical fiber network. Each optical fiber is arranged to receive light from the base light source, transmit the light received from the base light source to one or more of the node light detectors via an air gap, receive light from one or more of the node light sources via an air gap, and transmit the light received from the node light source(s) towards the base light detector.

20 Claims, 5 Drawing Sheets

DATA TRANSMISSION NETWORK

RELATED APPLICATIONS

The present application is based on, and claims priority from, British Application Number 1020201.8, filed Nov. 30, 2010, the disclosure of which is hereby incorporated by reference herein in its entirety.

FIELD OF THE INVENTION

The present invention relates to a data transmission network.

BACKGROUND OF THE INVENTION

A known data transmission network is described in Damon W. K. Wong, George Chen, "Optical design and multipath analysis for broadband optical wireless in an aircraft passenger cabin application", IEEE Transactions on Vehicular Technology, Vol. 57 (6), 3598-3606, November 2008. Multiple light sources are positioned in the ceiling of the aircraft cabin.

This system suffers from a number of disadvantages. Firstly, being in an aircraft cabin the system can only be operated at wavelengths which are safe to the human eye. Secondly, since multiple light sources are provided, this will make the system heavy and difficult to install. Thirdly, the light sources may interfere with each other in an unpredictable way.

Another known data transmission network is described in patent publication WO 02/05459. A central distribution system transmits a signal via optical fibres to local distribution nodes which communicate with user stations using free space optical links.

SUMMARY OF THE INVENTION

A first aspect of the invention provides a data transmission network comprising a base, a plurality of nodes, a plurality of optical fibres arranged to form a first optical fibre network and a plurality of optical fibres arranged to form a second optical fibre network. The base comprises a base light source and a base light detector; and the nodes each comprise a node light source and a node light detector. Each fibre of the first optical fibre network is arranged to:
  i. receive light from the base light source;
  ii. transmit the light received from the base light source to one or more of the node light detectors via an air gap;
  iii. receive light from one or more of the node light sources via an air gap; and
  iv. transmit the light received from the node light source(s) towards the base light detector.
A linking optical fibre is arranged to:
  i. receive light from the base light source;
  ii. transmit the light received from the base light source to the second optical fibre network;
  iii. receive light from the second optical fibre network; and
  iv. transmit the light received from the second optical fibre network towards the base light detector.
Each fibre of the second optical fibre network is arranged to;
  i. receive light from the linking optical fibre;
  ii. transmit the light received from the linking optical fibre to one or more of the node light detectors via an air gap;
  iii. receive light from one or more of the node light sources via an air gap; and
  iv. transmit the light received from the node light source(s) to the linking optical fibre.

A further aspect of the invention provides a method of communicating between a base and first and second sets of nodes, the base comprising a base light source and a base light detector; each node comprising a node light source and a node light detector, the method comprising: receiving light from the base light source with a plurality of optical fibres of a first network; each fibre of the first network transmitting the light received from the base light source to one or more of the node light detectors of the first set of nodes via an air gap; each fibre of the first network receiving light from one or more of the node light sources of the first set of nodes via an air gap; and each fibre of the first network transmitting the light received from the node light source(s) of the first set of nodes towards the base light detector; receiving light from the base light source with a linking optical fibre; the linking optical fibre transmitting the light received from the base light source to a second network comprising a plurality of optical fibres; each fibre of the second network receiving the light from the base light source transmitted by the linking optical fibre; each fibre of the second network transmitting the light from the base light source received from the linking optical fibre to one or more of the node light detectors of the second set of nodes via an air gap; each fibre of the second network receiving light from one or more of the node light sources of the second set of nodes via an air gap; each fibre of the second network transmitting the light received from the second set of node light source(s) towards the linking optical fibre; the linking fibre receiving the light transmitted by the second set of node light sources from the fibres of the second network; and the linking fibre transmitting the light received from the fibres of the second network towards the base light detector.

The optical fibres of the first network and/or the linking fibre may be arranged to receive light from the base light source via an air gap and transmit the light received from the node light source towards the base light detector via an air gap. Alternatively they may be "hard-wired" to the base, communicating without an air gap. Where an air gap is provided then a lens and/or repeater may be provided in the air gap.

The network may be a "hub and spoke" network, with the fibres grouped together at one end to form a hub. However other network architectures may also be possible—for instance a single fibre may connected to the base and split at multiple points (with optical splitters) to branch off to the nodes.

Preferably each optical fibre in the second network is arranged to receive light from the linking optical fibre via an air gap and transmit the light received from the node light source to the linking optical fibre via an air gap. Alternatively the first and second networks may be connected via an optical splitter with no air gap. Where a gap is provided between the linking optical fibre and the second network, then a lens and/or repeater may be provided in that air gap.

The optical fibres in the first and/or second network may be at least partially embedded within a fibre-reinforced composite structure.

Advantageously at least two of the optical fibres in the first or second network are arranged to receive light from the same base light source via an air gap and transmit light to the same node light detector via an air gap. This provides an element of redundancy. Preferably the light from the fibres has the same frequency and a constant phase relationship, so the node light detector can be placed in a region where the light from the fibres interferes in a predictable way.

The method may further comprise using the light from the base light source to broadcast data to all of the nodes; and addressing the data to one or a sub-set of the nodes. Typically only the node or sub-set of the nodes responds to the light from the base light source.

The light from each node light source may be encoded to identify the node from which it has been sent. Alternatively the nodes may communicate with the base only within an allotted time slot.

Typically the light has a wavelength in the infrared spectrum between 700 nm and 2500 nm, although other wavelengths (for instance within the visible spectrum) are possible.

The network may be used for a variety of applications. For instance it may be used to transmit data to and from a distributed array of sensors. Alternatively it may provide a local area network for transmitting data to and from a distributed array of laptops and/or personal computers within an aircraft or building. Where it is provided on an aircraft, then one preferred application involves nodes located within the wing and the base located in another part of the aircraft, such as the avionics bay beneath the cockpit.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
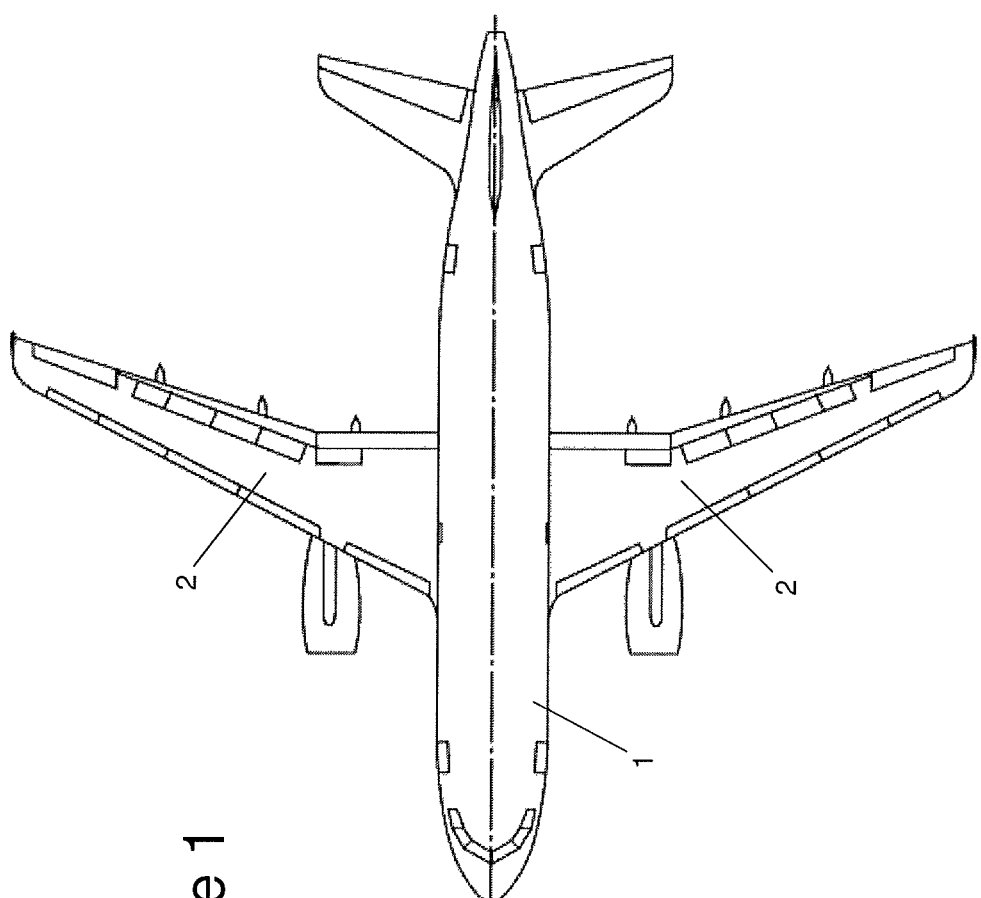
FIG. 1 is a plan view of an aircraft.

FIG. 1 is a plan view of an aircraft 1. The aircraft has a fuselage 1 and a pair of wings 2. The wings 2 carry fuel, and a fuel system comprising various sensors such as fuel gauge sensors, fuel temperature sensors, fuel flow sensors, or valve status sensors. Similarly, the fuselage carries various sensors.

Figure 2:
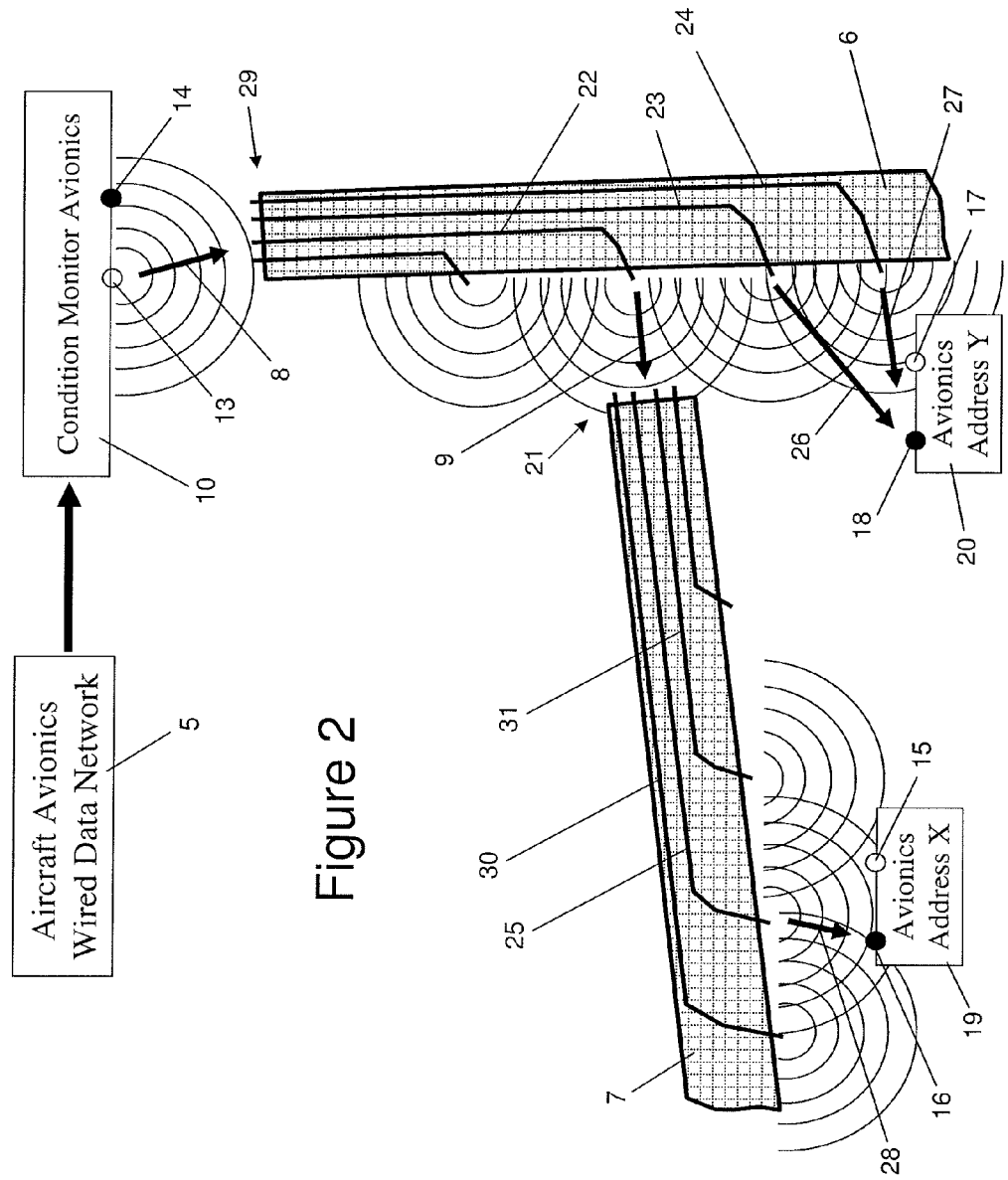
FIG. 2 is a schematic view of a data transmission network according to a first embodiment of the invention in a transmit mode.
Figure 3:
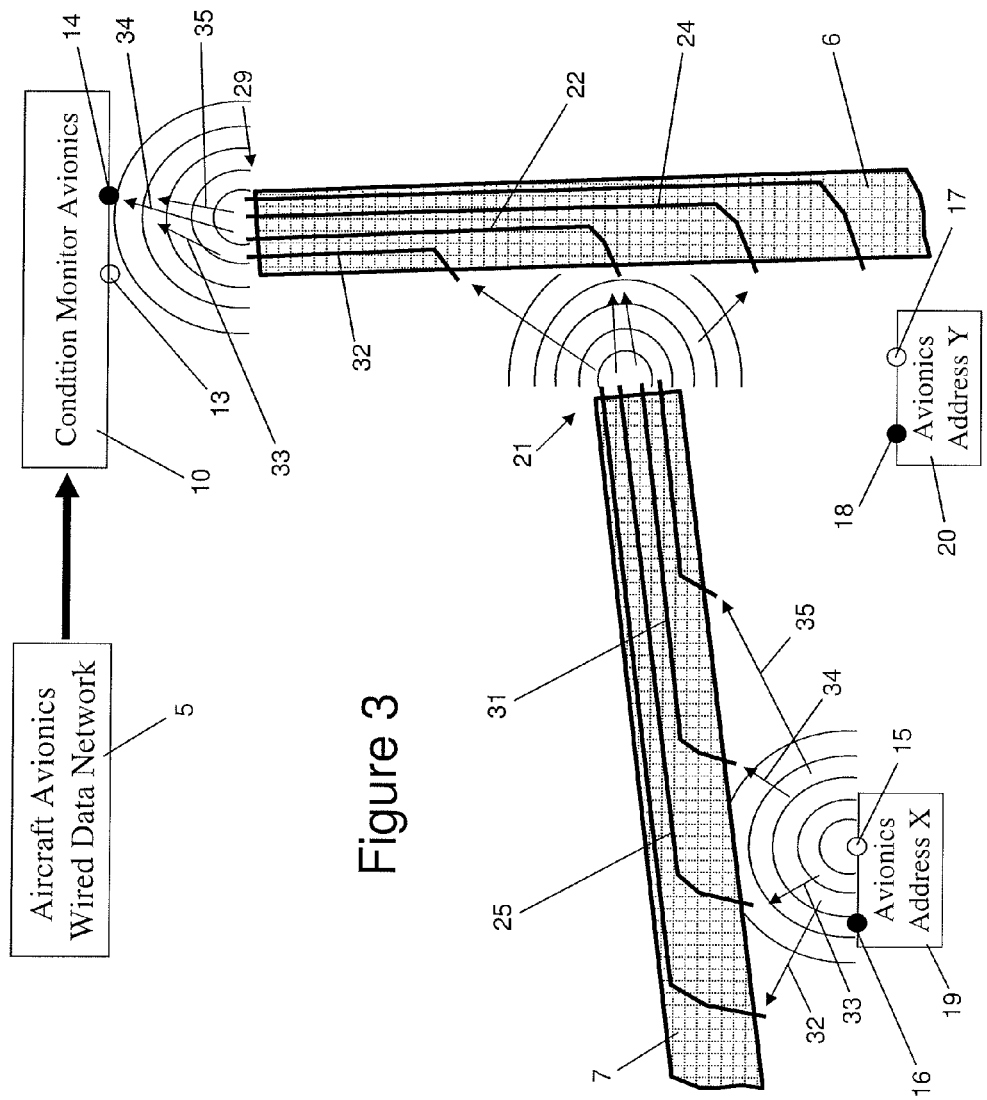
FIG. 3 shows the network in a receive mode.

FIGS. 2 and 3 show a data transmission network for communicating between the above-mentioned sensors and an avionics data network 5, such as an Avionics Full-Duplex Switched Ethernet (AFDX) network or an ARINC 429 avionics network.

The data transmission network comprises a condition monitor avionics module 10 with a light source 13 and a light detector 14. The condition monitor avionics module 10 is located in an avionics bay under the cockpit and acts as a hub of the data transmission network. A plurality of nodes are distributed throughout the aircraft. Only two nodes 19,20 are shown in FIG. 2, but in practice a much large number of nodes will be provided. Each node has a node light source 15,17 and a node light detector 16,18. The data transmission network broadcasts data to the nodes by the method described below.

Two hub-and-spoke optical fibre networks couple the nodes to the base 10. The first network comprises a plurality of fibres which are embedded within the fuselage 6. The fuselage is a composite structure comprising a series of layers of carbon-fire reinforced epoxy resin. The fibres are laid up within the composite structure 6 during manufacture.

The fibres in the first network are bunched together at one end to form a hub 29. Each optical fibre in the first network has a hub end which is arranged to receive light from the base light source 13 across an air gap 8. Most of the optical fibres in the first network also have node ends which can transmit directly to a node via an air gap. For instance the fibres 23,24 simultaneously transmit the light received from the base light source 3 to the node light detector 18 via air gaps 26,27 respectively.

One of the fibres in the first network is a linking fibre 22 which is arranged to receive light from the base light source 3 and transmit it to the second hub-and-spoke optical fibre network. The second network comprises a plurality of fibres which are embedded within a spar 7 of one of the wings 2. The spar 7 is a composite structure comprising a series of layers of carbon-fire reinforced epoxy resin. The fibres are laid up within the composite structure 7 during manufacture.

The fibres in the second network are bunched together at one end to form a hub 21. Each optical fibre in the second network has a hub end which is arranged to receive light from the linking fibre 23 across an air gap 9 at the joint where the spar meets the fuselage. All of the optical fibres in the second network can transmit light directly to a node via an air gap. For instance the fibre 25 leads to a node 19 and transmits the light received from the linking fibre 22 to the node light detector 16 via an air gap 28.

Note that although the light from the optical fibre 25 will provide the greatest signal to the detector 16, a certain amount of light will also be picked up from the adjacent fibres 30,31. However since the light from the fibres 25,30,31 has the same frequency and a constant phase relationship, the detector 16 can be placed in a region where the light from the fibres interferes constructively. This also applies to the node 20, in that the detector 18 receives light from both fibres 23,24.

FIG. 3 shows the system in a transmit mode. In this case the node light source 15 is transmitting and the fibres in the second network receive light from the node light source 15 via air gaps 32-35 and simultaneously transmit it towards the base light detector 14 via the first network. At the hub 21 light is transmitted from the first to the second network via air gaps. The strongest coupling is from the fibres 25,31 to the fibre 22, but a small amount of light will also be transmitted to and from the adjacent fibres as shown in FIG. 3.

At the hub 29, the fibres 22,24,32 transmit light received from the node 19 to the base light detector 14 via air gaps 33-35.

When the network 5 needs to communicate with a sensor at an address X, the condition monitor avionics 10 broadcasts a signal over the optical fibre networks to request for data from avionics address X (for example, node 19). The node 19 may be addressed by (for instance) encoding the transmission or sending an address packet with address data X which uniquely identifies the node 19. Although the data is simultaneously broadcast to all nodes (including nodes which are not addressed) only avionics address X (node 19) responds. Node 19 then sends its data to the condition monitor avionics 10 via the optical fibre networks. The condition monitor avionics 10 typically polls all nodes to be monitored in sequence and collects the individual reports.

The nodes can request use of the optical fibre networks arbitrarily, so the avionics module 10 operates a collision detection protocol which grants exclusive access to a particular node, with all other nodes then being subdued until the exchange is terminated.

Communication between the nodes can be handled by buffering at the condition monitor avionics hub 5, as can communication between the nodes and an external system (other parts of the avionics or the internet for instance).

Figure 4:
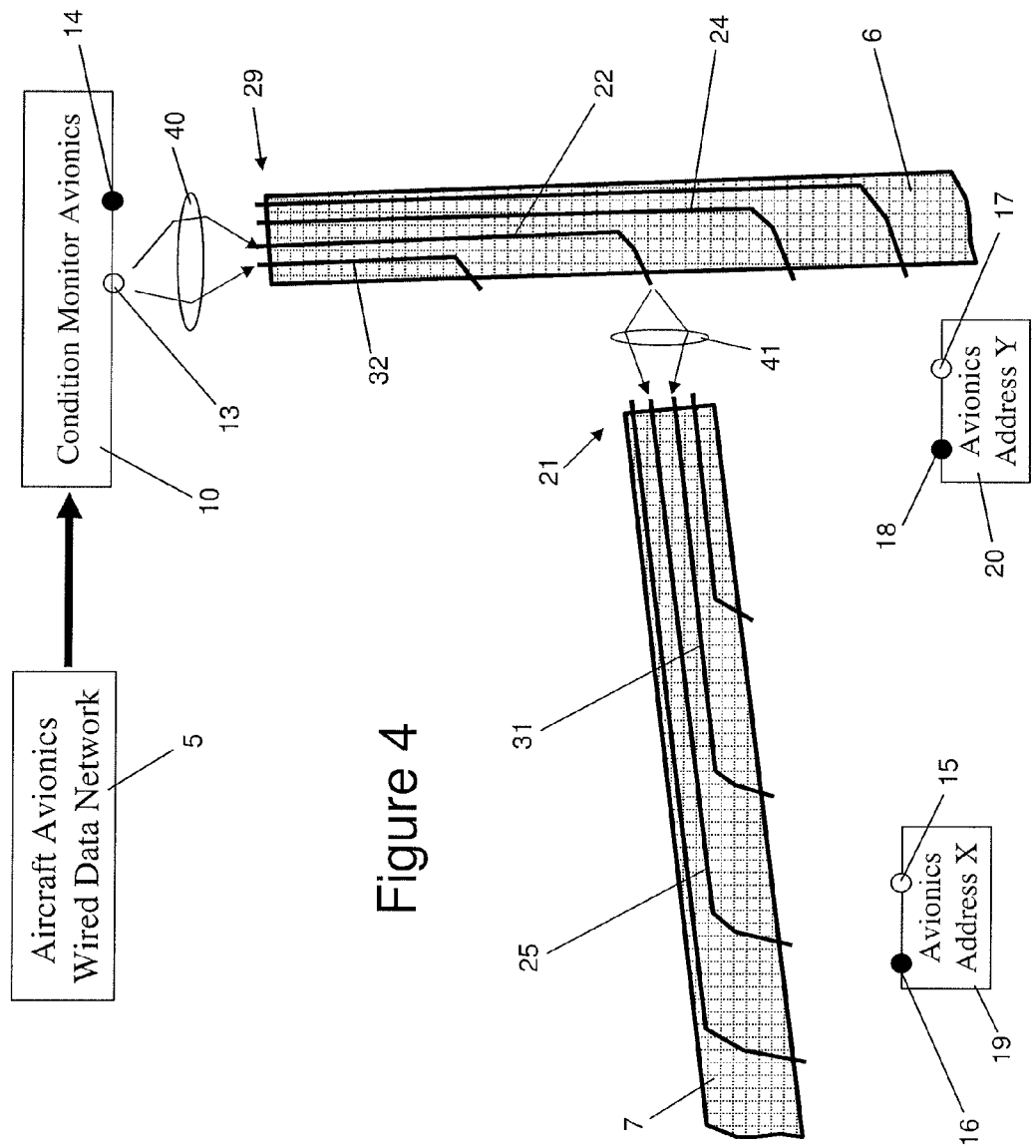
FIG. 4 shows the network with the addition of a pair of lenses.
Figure 5:
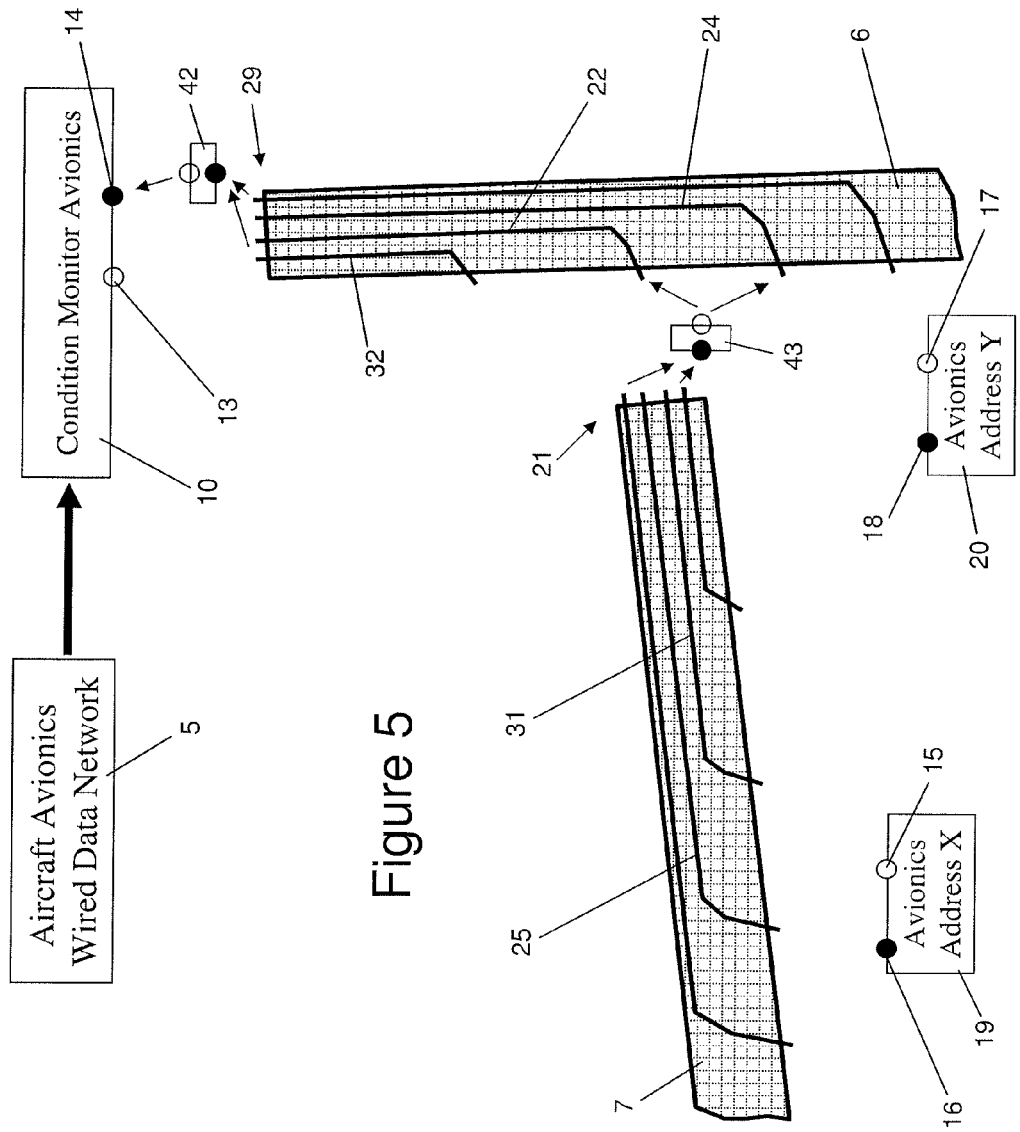
FIG. 5 shows the network with the addition of a pair of repeaters.

Lenses 40,41 (FIG. 4) and/or repeaters 42,43 (FIG. 5) may be provided in the air gaps as shown in FIGS. 4 and 5 in order to compensate for transmission losses across the air gaps.

Typically the network operates with light in the near infrared region with a wavelength between 700 nm and 2500 nm.

The network has a number of advantages over a conventional electrical network. The use of optical fibres instead of electrical wires reduces the risk of sparking. This is particularly advantageous within the wings 2 since they house the majority of the fuel on the aircraft. The use of optical fibres instead of electrical wires also reduces the risk of electromagnetic interference (both emissions and susceptibility). Embedding the fibres within the structures 6,7 minimises wire handling issues. The multiple paths between the hub and each node provides failure tolerance. Optical data transmission has large bandwidth, and good signal-to-noise ratio. Transmitting to and from the nodes via an air gap enables each node to be placed at any point along the length of the spar or the fuselage, as long as the node is sufficiently close to the tip of one or more of the optical fibres. This enables the network to be assembled or re-configured more quickly and easily than a hard-wired electric network. The use of optical fibres instead of electrical wires provides a further advantage on an aircraft since the optical fibres are lighter (glass at 2.5 g/cm$^3$ being lighter than copper at 8.9 g/cm$^3$).

Since the optical fibres have a very small cross section and the transmitting fibre spreads the light in a cone, then the level of light reaching the receiving fiber would be the ratio of the fibre diameter over the cone diameter which may be small. Hence each receiver 14,16,18 may have an associated amplifier and/or an associated directing lens (not shown).

In the embodiment of the invention described above, the data transmission network communicates between sensors and an avionics data network. In an alternative embodiment of the invention (not shown) a similar data transmission network can be used to provide a Local Area Network (LAN) for the transfer of other data such as in-flight entertainment data to the laptop computers of passengers in an aircraft cabin (that is, for a similar purpose to the network described in Damon W. K. Wong, George Chen. "Optical design and multipath analysis for broadband optical wireless in an aircraft passenger cabin application", IEEE Transactions on Vehicular Technology, Vol. 57 (6), 3598-3606, November 2008). In such an arrangement, the passengers' laptops could provide receiver amplification, perhaps with a USB dongle.

Although the invention has been described above with reference to one or more preferred embodiments, it will be appreciated that various changes or modifications may be made without departing from the scope of the invention as defined in the appended claims.

The invention claimed is:

1. A data transmission network comprising:
   a. a base comprising:
      i. a base light source; and
      ii. a base light detector;
   b. a plurality of nodes, each node comprising:
      i. a node light source; and
      ii. a node light detector;
   c. a plurality of optical fibres arranged to form a first optical fibre network, each optical fibre in the first optical fibre network being arranged to:
      i. receive light from the base light source;
      ii. transmit the light received from the base light source to one or more of the node light detectors via an air gap;
      iii. receive light from one or more of the node light sources via an air gap; and
      iv. transmit the light received from the node light source(s) towards the base light detector;
   d. a plurality of optical fibres arranged to form a second optical fibre network; and
   e. a linking optical fibre which is arranged to:
      i. receive light from the base light source;
      ii. transmit the light received from the base light source to the second optical fibre network;
      iii. receive light from the second optical fibre network; and
      iv. transmit the light received from the second optical fibre network towards the base light detector,
   wherein the second optical fibre network comprises a plurality of optical fibres, each optical fibre in the second optical fibre network being arranged to;
      i. receive light from the linking optical fibre;
      ii. transmit the light received from the linking optical fibre to one or more of the node light detectors via an air gap;
      iii. receive light from one or more of the node light sources via an air; and
      iv. transmit the light received from the node light source(s) to the linking optical fibre.

2. An aircraft comprising a wing; and a network according to claim 1 with the second optical fibre network located within the wing and the base located in another part of the aircraft.

3. The aircraft of claim 2 wherein the wing comprises a spar; and the optical fibres in the second optical fibre network are carried by the spar.

4. A method of communicating between a base and first and second sets of nodes, the base comprising a base light source and a base light detector; each node comprising a node light source and a node light detector, the method comprising:
   a. receiving light from the base light source with a plurality of optical fibres of a first network;
   b. each fibre of the first network transmitting the light received from the base light source to one or more of the node light detectors of the first set of nodes via an air gap;
   c. each fibre of the first network receiving light from one or more of the node light sources of the first set of nodes via an air gap; and
   d. each fibre of the first network transmitting the light received from the node light source(s) of the first set of nodes towards the base light detector;
   e. receiving light from the base light source with a linking optical fibre;
   f. the linking optical fibre transmitting the light received from the base light source to a second network comprising a plurality of optical fibres;
   g. each fibre of the second network receiving the light from the base light source transmitted by the linking optical fibre;
   h. each fibre of the second network transmitting the light from the base light source received from the linking optical fibre to one or more of the node light detectors of the second set of nodes via an air gap;
   i. each fibre of the second network receiving light from one or more of the node light sources of the second set of nodes via an air gap;
   j. each fibres of the second network transmitting the light received from the second set of node light source(s) towards the linking optical fibre;

k. the linking fibre receiving the light transmitted by the second set of node light sources from the fibres of the second network; and l. the linking fibre transmitting the light received from the fibres of the second network towards the base light detector.

5. The method of claim 4, wherein the method is executed in an aircraft avionics system.

6. A data transmission network comprising:
  a. a base comprising:
    i. a base light source; and
    ii. a base light detector;
  b. a plurality of nodes, each node comprising:
    i. a node light source; and
    ii. a node light detector;
  c. a plurality of optical fibres arranged to form a first optical fibre network, each optical fibre in the first optical fibre network being arranged to;
    i. receive light from the base light source;
    ii. transmit the light received from the base light source to one or more of the node light detectors via an air gap to enable said base light source to communicate with said one or more of the node light detectors via said air gap;
    iii. receive light from one or more of the node light sources via an air gap to enable said one or more of the node light sources to communicate with said base light detector via said air gap; and
    iv. transmit the light received from the node light source(s) towards the base light detector;
  d. a plurality of optical fibres arranged to form a second optical fibre network; and
  e. a linking optical fibre which is arranged to:
    i. receive light from the base light source;
    ii. transmit the light received from the base light source to the second optical fibre network;
    iii. receive light from the second optical fibre network; and
    iv. transmit the light received from the second optical fibre network towards the base light detector,
  wherein the second optical fibre network comprises a plurality of optical fibres, each optical fibre in the second optical fibre network being arranged to:
    i. receive light from the linking optical fibre;
    ii. transmit the light received from the linking optical fibre to one or more of the node light detectors via an air gap to enable said linking optical fibre to communicate with said one or more of the node light detectors via said air gap;
    iii. receive light from one or more of the node light sources via an air gap to enable said one or more of the node light sources to communicate with said linking optical fibre via said air gap; and
    iv. transmit the light received from the node light source(s) to the linking optical fibre.

7. The network of claim 6 wherein each optical fibre in the first network is arranged to receive light from the base light source via an air gap and transmit the light received from the node light source towards the base light detector via an air gap.

8. The network of claim 7 further comprising a lens and/or repeater in the air gap between the base light source and the optical fibres in the first network.

9. The network of claim 6 wherein each optical fibre in the second network is arranged to receive light from the linking optical fibre via an air gap to enable said linking optical fibre to communicate with said optical fibre of the second network via said air gap and transmit the light received from the node light source to the linking optical fibre via an air gap to enable said node light source to communicate with said linking optical fibre via said air gap.

10. The network of claim 9 further comprising a lens and/or repeater in the air gap between the linking optical fibre and the second network.

11. The network of claim 6 wherein the optical fibres in the first and/or second network are at least partially embedded within a fibre-reinforced composite structure.

12. The network of claim 6 wherein at least two of the optical fibres in the first or second network are arranged to receive light from the same base light source via an air gap to enable said base light source to communicate with said at least two of the optical fibres in the first or second network via said air gap and transmit light to the same node light detector via an air gap to enable said at least two of the optical fibres in the first or second network to communicate with said node light detector via said air gap.

13. An aircraft comprising a wing; and a network according to claim 6 with the second optical fibre network located within the wing and the base located in another part of the aircraft.

14. The aircraft of claim 13 wherein the wing comprises a spar; and the optical fibres in the second optical fibre network are carried by the spar.

15. A method of communicating between a base and first and second sets of nodes, the base comprising a base light source and a base light detector; each node comprising a node light source and a node light detector, the method comprising:
  a. receiving light from the base light source with a plurality of optical fibres of a first network;
  b. each fibre of the first network transmitting the light received from the base light source to one or more of the node light detectors of the first set of nodes via an air gap to enable said base light source to communicate with said one or more node light detectors of the first set of nodes via said air gap;
  c. each fibre of the first network receiving light from one or more of the node light sources of the first set of nodes via an air gap to enable said one or more of the node light sources of the first set of nodes to communicate with said base light detector via said air gap; and
  d. each fibre of the first network transmitting the light received from the node light source(s) of the first set of nodes towards the base light detector;
  e. receiving light from the base light source with a linking optical fibre;
  f. the linking optical fibre transmitting the light received from the base light source to a second network comprising a plurality of optical fibres;
  g. each fibre of the second network receiving the light from the base light source transmitted by the linking optical fibre;
  h. each fibre of the second network transmitting the light from the base light source received from the linking optical fibre to one or more of the node light detectors of the second set of nodes via an air gap to enable said linking optical fibre to communicate with said one or more of the node light detectors of the second set of nodes via said air gap;
  i. each fibre of the second network receiving light from one or more of the node light sources of the second set of nodes via an air gap to enable said one or more of the node light sources of the second set of nodes to communicate with said linking optical fibre via said air gap;

j. each fibres of the second network transmitting the light received from the second set of node light source(s) towards the linking optical fibre;
k. the linking fibre receiving the light transmitted by the second set of node light sources from the fibres of the second network; and
l. the linking fibre transmitting the light received from the fibres of the second network towards the base light detector.

16. The method of claim 15 further comprising using the light from the base light source to broadcast data to all of the nodes; and addressing the data to one or a sub-set of the nodes.

17. The method of claim 16 wherein only the addressed node or sub-set of the nodes responds to the light from the base light source.

18. The method of claim 15 wherein the second set of nodes are located within the wing of an aircraft and the base is located in another part of the aircraft.

19. The method of claim 15 wherein the light has a wavelength between 700 nm and 2500 nm.

20. The method of claim 15, wherein the method is executed in an aircraft avionics system.

* * * * *